United States Patent Office 3,014,171
Patented Dec. 19, 1961

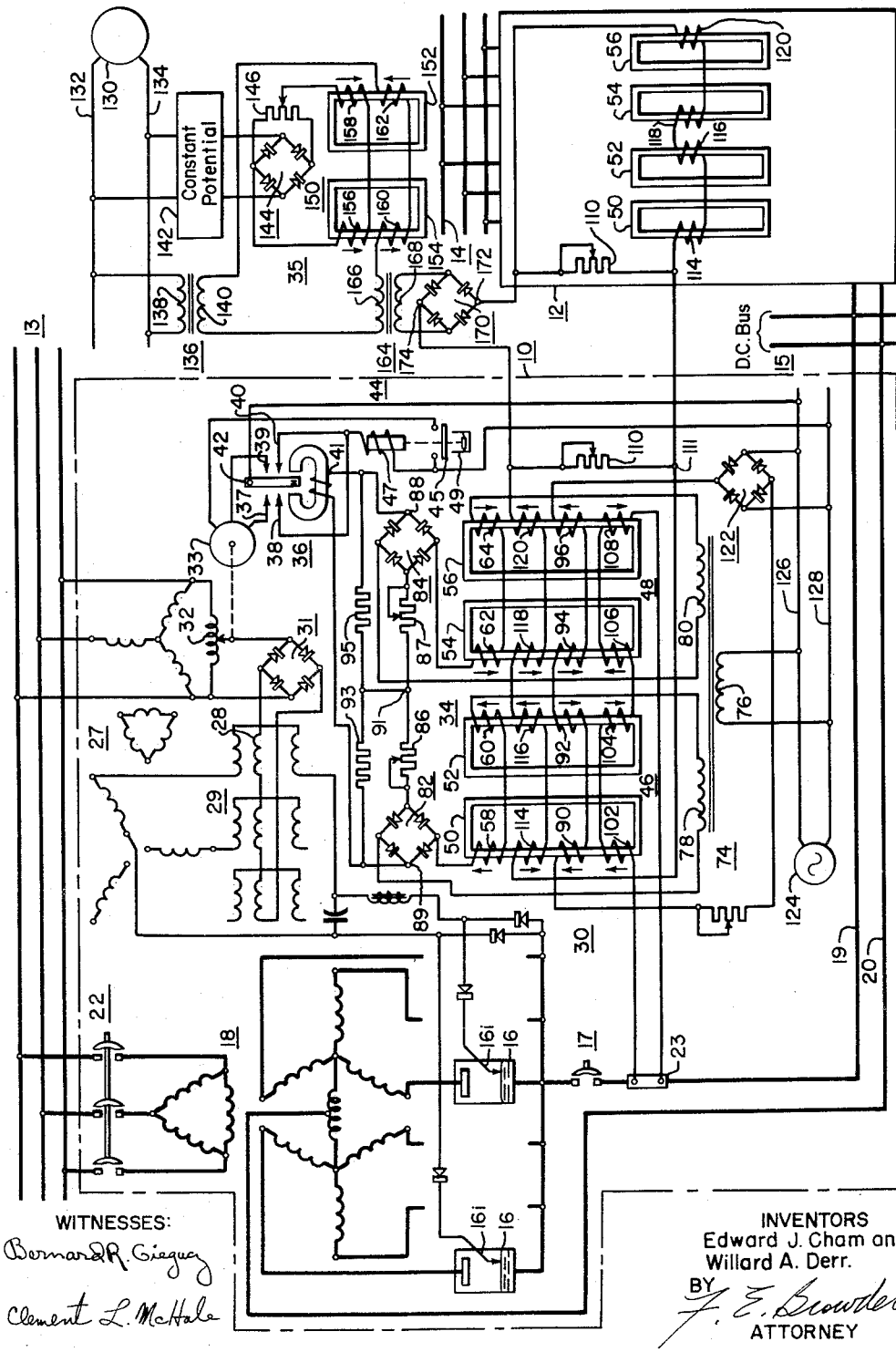

3,014,171
AUTOMATIC CONTROL OF CURRENT DIVISION OF PARALLELED RECTIFIERS
Edward J. Cham, Irwin, and Willard A. Derr, Pittsburgh, Pa., assignors to Westinghouse Electric Corporation, East Pittsburgh, Pa., a corporation of Pennsylvania
Filed Apr. 29, 1957, Ser. No. 655,749
11 Claims. (Cl. 321—19)

This invention relates to control systems in general, and more particularly to control systems adapted to be used with rectifier installations.

The division of load current among several rectifier units operating in parallel has in the past been generally accomplished by manual control. Such manual operation becomes clumsy and difficult where large numbers of rectifier units operating in parallel are employed as in the case of electrochemical pot lines. Frequent adjustment is necessary to maintain any desired division of load current among the various rectifier units operating in parallel.

In addition, difficulty is also experienced when one of the rectifier units operating in parallel is lost due to an arc back thereby causing the remaining rectifier units to pick up additional load current. The resulting overload on the other rectifier units may cause additional rectifier units to arc back and thereby eventually result in all of the rectifier units being removed from operation.

It is, therefore, one object of this invention to provide a new and improved control system for rectifier units operating in parallel.

Another object of this invention is to provide a new and improved means for automatically controlling the division of load current among rectifier units operating in parallel.

Another object of this invention is to provide in a rectifier control system for a plurality of rectifier units operating in parallel for automatically regulating the output load current of each rectifier unit and for properly dividing the load current among the various rectifier units.

Other objects of the invention will in part be obvious and will in part appear hereinafter.

For a fuller understanding of the nature and objects of the invention, reference should be had to the following detailed description taken in connection with the accompanying drawing, in which the single FIGURE diagrammatically illustrates this invention.

Referring to the drawing, it will be seen that a plurality of rectifier units represented by the two units 10 and 12 may be connected to either a common alternating current bus, or to separate alternating current buses 13 and 14 for supplying electrical energy to a common direct current bus 15. Since the several units may be substantially identical, only the unit 10 has been shown in detail, and it will be realized that the unit 12 and other such units as may be connected therewith, are substantially identical in all respects.

The rectifier 10 may comprise a plurality of separate rectifier devices 16 (only two of which are shown) which may be connected in circuit relation with the several phases of a delta or Y six-phase double Y rectifier transformer 18 for supplying a direct current output circuit comprising positive and negative conductors 19 and 20, which connect to the direct current bus 15. The primary windings of the rectifier transformer may be connected to the conductors of alternating current source 13 by means of a circuit breaker 22 of any suitable type.

Excitation of the several rectifier devices 16 may be provided by means of an excitation transformer 27, which may be energized from the conductors of the alternating current source 13 and connected through saturable reactor control means 29 to the ignitors 16i of the rectifier devices. For the purposes of simplification, only phases three and six are shown connected. The ignitors of the rectifier devices of the other phases may be connected in a manner well known in the art. Phase control of the rectifier devices may be effected by connecting the saturating windings 28 of the several control reactors 29 to an adjustable source of control voltage. For example, they may be connected to a rectifier bridge circuit 31 disposed to be energized from a variable voltage autotransformer 32 whose output is controlled by a reversible motor 33.

Connection of the rectifier unit 10 to the direct current bus 15 may be effected by means of a direct current circuit breaker 17, which may be of any suitable type. In order to obtain a measure of the output load current of the rectifier unit 10, a shunt resistor 23 is connected in series circuit relationship between the circuit breaker 17 and the direct current bus 15 in the conductor 19.

In order to maintain the output load current of the rectifier unit 10 substantially constant, a regulator loop 30, comprising a push-pull magnetic amplifier 34 and a polarized device 36 is interconnected between the output of the rectifier unit 10 and the variable voltage autotransformer 32 in the excitation circuit of the rectifier unit 10.

A current reference circuit 35 is provided for controlling the value of the output load current of the rectifier unit 10 at which the regulator loop 30 maintains the output load current and cooperates with the push-pull magnetic amplifier 34, of the regulator loop 30, to vary the regulated value of the output load current of the rectifier unit 10. For purposes of clarity, the components and operation of the regulator loop 30 will be described before describing the various components and operation of the current reference circuit 35.

As illustrated, the push-pull magnetic amplifier 34 is of well-known construction and comprises two main sections, 46 and 48. The section 46 includes two magnetic core members 50 and 52, and the section 48 includes two magnetic core members 54 and 56. In this instance, load windings 58, 60, 62 and 64 are disposed in inductive relationship with the magnetic core members 50, 52, 54 and 56, respectively.

Energy for the load windings 58, 60, 62 and 64 of the magnetic amplifier 34 is received from a transformer 74 having a primary winding 76, which in this instance is connected to the alternating current source 124 across conductors 126 and 128, and secondary winding sections 78 and 80. As illustrated, a full-wave dry-type load rectifier 82 and a rheostat 86 are connected in series circuit relationship with the load windings 58 and 60 of the section 46, and with the secondary winding section 78 of the transformer 74 in order to produce a direct current output for the section 46 across the terminals 89 and 91. In like manner, a full-wave dry-type load rectifier 84 and a rheostat 87 are connected in series circuit relationship with the load windings 62 and 64 of the section 48, and with the secondary winding section 80 of the transformer 74, in order to obtain a direct current output for the section 48 across the terminals 91 and 88. The resistors 93 and 95 are connected in series circuit relationship across the output terminals 89 and 88 of the magnetic amplifier 34 with one end of each resistor being connected at terminal 91 in order to connect the output voltages of the sections 46 and 48 in series circuit relationship and provide a single output voltage of the magnetic amplifier 34. In this instance, the polarized device 36 is responsive to the polarity of the output voltage of the magnetic amplifier 34 which appears across terminals 89 and 88.

For the purpose of effecting predetermined magnetization of each of the cores of the sections 46 and 48 of the magnetic amplifier 34, bias windings 90, 92, 94 and 96 are disposed in inductive relationship with the magnetic core members 50, 52, 54 and 56, respectively. In particular, the bias windings 90, 92, 94 and 96 are connected in series circuit relationship with one another, the series circuit being connected to a suitable source of direct current. As illustrated, the source of direct current comprises a full-wave dry-type load rectifier 122 connected for energization from the source of alternating current 124 across the conductors 126 and 128.

As illustrated, the bias windings 90 and 92 of the magnetic core members 50 and 52 respectively are connected with proper polarity to provide cumulative magnetization of the associated magnetic core members 50 and 52 relative to the control windings 102 and 104 as indicated by the arrows associated with said windings. The bias windings 94 and 96 of the magnetic core members 54 and 56, respectively, are connected with proper polarity to provide differential magnetization of the associated magnetic core members 54 and 56 relative to the control windings 106 and 108 as represented by the arrows associated with said windings.

In order to obtain a reference point from which to operate in each of the sections 46 and 48 of the magnetic amplifier 34, reference windings 114, 116, 118 and 120 are disposed in inductive relationship with the magnetic core members 50, 52, 54 and 56, respectively. The reference windings 114, 116, 118 and 120 are so disposed on their respective magnetic core members 50, 52, 54 and 56 that the current flow through the reference windings 114, 116, 118 and 120 produces a magnetomotive force that opposes the magnetomotive force produced by the respective control windings 102, 104, 106 and 108. As illustrated, the reference windings 114, 116, 118 and 120 are connected in series circuit relationship with one another, the series circuit being connected across the output terminals 172 and 174 of the current reference circuit 35. The variable resistor 110 of the rectifier unit 10 is connected in parallel with the reference windings 114, 116, 118 and 120 at terminals 174 and 111 in order to independently vary the portion of the output current from the current reference circuit 35 that flows through the reference windings 114, 116, 118 and 120 and the portion of the total output current supplied by the rectifier unit 10 to the direct current bus 15. The variable resistor 110 of the rectifier unit 12 also performs the same function with respect to the reference windings 114, 116, 118 and 120 of the rectifier unit 12.

The control windings 102, 104, 106 and 108 are disposed in inductive relationship with the magnetic core members 50, 52, 54 and 56, respectively. The control windings 102, 104, 106 and 108 are connected in series circuit relationship with one another, the series circuit being connected across the shunt resistor 23 in order to obtain a measure of the output load current of the rectifier unit 10.

The control windings 102, 104, 106 and 108 are so disposed on their respective magnetic core members 50, 52, 54 and 56 that when current flows therethrough a magnetomotive force is produced in their respective magnetic core members that opposes the magnetomotive force produced by the current flow through the respective reference windings 114, 116, 118 and 120. The output load current of the rectifier unit 10 is at its regulated value when the magnetomotive forces produced by the current flow through the control windings 102, 104, 106 and 108 are equal to the respective magnetomotive forces produced by the current flow through the reference windings 114, 116, 118 and 120.

Referring to the drawing, a polarized device, specifically a polarized relay 36 is provided with an operating coil 41 which is connected across the output of the magnetic amplifier 34 at terminals 88 and 89. Depending upon the polarity of the output voltage of the magnetic amplifier 34, the armature 42 of the polarized relay 36 either connects stationary contacts 37 and 38 or stationary contacts 39 and 40 of the polarized relay 36. If the armature 42 of the polarized relay 36 moves to connect either set of stationary contacts, then the operating coil 47 of the timing relay 44 will be connected to the source of alternating current 124 across the conductors 126 and 128. The normally open contact bar 45 of the timing relay 44 will then close after an adjustable time delay determined by the setting of the dashpot 49. The timing relay 44 is provided as part of the regulator loop 30 in order to prevent hunting or a too rapid adjustment of the output load current of the rectifier unit 10. The time delay introduced by the timing relay 44 can be adjusted for any time interval that results in the best performance of the regulator loop 30. After the normally open contact bar 45 of the timing relay 44 closes, the reversible motor 33 of the variable voltage autotransformer 32 will then be connected to the source of alternating current 124 across the conductors 126 and 128. The direction of rotation of the reversible motor 33, after it is connected to the source of alternating current 124, will be determined by the polarized relay 36 which may connect either stationary contacts 37 and 38 or stationary contacts 39 and 40 depending upon the polarity of the output voltage of the magnetic amplifier 34. A change in the setting of the variable voltage autotransformer 32 caused by rotation of the reversible motor 33 will result in a corresponding change in the excitation supplied to the rectifier devices 16 of the rectifier unit 10 and a corresponding change in the output load current of the rectifier unit 10.

In operation, when the output load current of the rectifier unit 10 increases to a value above its regulated value, the current flow through the control windings 102, 104, 106 and 108 increases to thereby decrease the output current from the section 46 of the magnetic amplifier 34 and increase the output current from the section 48 of the magnetic amplifier 34. Such an action causes an unbalanced voltage to appear across the output terminals 88 and 89 of the magnetic amplifier 34. The polarity of this unbalanced output voltage is such that the polarized relay 36 is energized so as to cause the reversible motor 33 to change the setting of the variable voltage autotransformer 32 in such a way as to thereby reduce the output load current of the rectifier unit 10 and return it to its regulated value.

On the other hand, a decrease in the output load current of the rectifier unit 10 to a value below its regulated value decreases the magnitude of the current flow to the control windings 102, 104, 106 and 108. A decrease in the current flow through the control windings 102, 104, 106 and 108 unbalances the push-pull magnetic amplifier 34 in such a direction that the output current from the section 46 of the amplifier 34 increases and the output current from the section 48 decreases. Such an action causes an unbalanced voltage to appear across the output terminals 88 and 89 of the magnetic amplifier 34. The polarity of this unbalanced output voltage is such that the polarized relay 36 is energized so as to cause the reversible motor 33 to change the setting of the variable voltage autotransformer 32 in such a way as to thereby increase the output current of the rectifier unit 10 and return it to its regulated value.

The current reference circuit 35 will now be described. Broadly, the current reference circuit 35 comprises circuit means, specifically a saturable reactor 150, whose adjustable output current remains substantially constant over a wide range of resistance in the output circuit.

As illustrated, the saturable reactor 150 is of well-known construction and comprises two magnetic cores 152 and 154 on which are inductively disposed control windings 156 and 158, respectively, and load windings 160 and 162, respectively. The control windings 156 and 158 are connected in series circuit relationship with one another, the series circuit being connected across a variable resistor 146 which in turn is connected across the output terminals of a full-wave, dry-type rectifier 144. In order that the current flow through the control windings 156 and 158 remain substantially constant, the input terminals of the rectifier 144 are connected to a constant potential device 142 which produces at its output a substantially constant alternating current irrespective of the magnitude of the output voltage of the alternating current source 130 to which the constant potential device 142 is connected across conductors 132 and 134. The variable resistor 146 is provided in order that the substantially constant output reference current of the saturable reactor 150 may be adjusted to control the output load currents of the rectifier units 10 and 12 simultaneously.

Energy for the load windings 160 and 162 of the saturable reactor 150 is received from a transformer 136 having a primary winding 138 which in this instance is connected to the alternating current source 130 across the conductors 132 and 134, and a secondary winding 140 which is connected in series circuit relationship with the load windings 160 and 162 and the primary winding 166 of the transformer 164. The transformer 164 is provided in order that the output reference current of the current reference circuit 35 may bear a more nearly linear relationship to the current which flows through the control windings 156 and 158. The secondary winding 168 of the transformer 164 is connected across a full-wave dry-type rectifier 170 in order to obtain a direct current output from the current reference circuit 35. As previously explained, the output of the current reference circuit 35 appears across the full-wave dry-type rectifier 170 at terminals 172 and 174 and a portion of the output reference current is applied to the reference windings of each magnetic amplifier controlling the output load current of a rectifier unit connected to the direct current bus 15.

The operation of the current reference circuit 35 will now be described. The impedance of each of the load windings 160 and 162 is dependent upon the magnetic condition of the magnetic core members 154 and 152, respectively. Low energization of the magnetic core members 154 and 152 by the control windings 156 and 158 is effective to saturate the cores 154 and 152 to a slight degree with a result that the impedances of the load windings 160 and 162 are of a substantially high value. If saturation of the magnetic core members 154 and 152 is increased by increased current flow through the control windings 156 and 158, the impedance of the load windings 160 and 162 decreases to a substantially low value, thus increasing the output reference current from the current reference circuit 35. Since the saturable reactor 150 may have a small output current for negligible values of current flowing in the control windings 156 and 158, the transformer 164 is provided in order that this small value of output current may be taken up as exciting current for the transformer 164 and to improve the linearity of the saturable reactor 150 and the output reference current for small values of current flowing in the control windings 156 and 158.

The effect of the current reference circuit 35 upon the operation of the regulator loop 30 will now be considered. When the current flowing in the reference windings 114, 116, 118 and 120 of the magnetic amplifier 34 is equal to the current flowing in the control windings 102, 104, 106 and 108, the output of the rectifier unit 10 is at its regulated value. Therefore, if the output reference current from the current reference circuit 35 is increased, the regulator loop 30 will also increase the regulated output load current for the rectifier unit 10. This is because the current flowing in the control windings 102, 104, 106 and 108 will also have to increase to maintain the output load current at its new regulated value. When the output reference current of the current reference circuit 35 is decreased, the regulator loop 30 will then decrease the regulated value of output load current of the rectifier unit 10. Such changes in the output reference current from the current reference circuit 35 would also be reflected in the output load current of the rectifier unit 12. It will thus be seen that the total output load current supplied to the direct current bus 15 may be changed by simultaneously changing the output reference current suppiled to the regulator loop 30 of each rectifier unit.

The apparatus embodying the teachings of this invention has several advantages. For instance, the control system disclosed provides a relatively simple adjustment to simultaneously raise or lower the current output of each of a plurality of rectifier units operating in parallel in direct proportion to the share of load current that each was previously supplying to a common direct current bus. The control system disclosed also provides a single adjustment or each rectifier unit which makes it possible to independently change the output load current of any individual rectifier unit without affecting the output load current of any of the other rectifier units operating in parallel. In addition, if any rectifier unit is disconnected from the common bus because of an arc back or other fault condition arising in an individual rectifier unit, the output load current of the other rectifier units still connected to the common bus will be unaffected.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a control system for a plurality of rectifier units operating in parallel with each of said units having an excitation circuit, a plurality of rectifier devices, an input connected to power supply means and an output connected to a common bus, the combination comprising first means for measuring the output current of each of said rectifier units, second means for providing a common reference current, third means for separately comparing the output current of each of said rectifier units with a portion of said common reference current, fourth means connected in circuit relation with said third means for separately controlling each of said excitation circuits in accordance with the larger of said portion of said common reference current or said output current of each of said rectifier units to maintain the output current of each of said rectifier units at substantially a predetermined value and fifth means for independently varying the portion of said common reference current applied to each of said third means and controlling the portion of the total output current supplied by each of said units to said common bus.

2. In a control system for a plurality of rectifier units operating in parallel with each of said units having an excitation circuit, an input connected to power supply means and an output connected to a common bus, the combination comprising first means for measuring the output current of each of said rectifier units, second means for providing a common reference current to each of said first means, third means for separately comparing the output current of each of said common rectifier units with said reference current, fourth means for separately controlling each of said excitation circuits in accordance with the larger of said reference current or said output current of each of said rectifier units to maintain the output current of each of said rectifier units at substantially a predetermined value, and fifth means for simultaneously changing the common reference current provided for each of said third means to change the substantially predetermined value at which the output current of each of said rectifier units is maintained and the total output current supplied by said plurality of units to said common bus.

3. In a control system for a plurality of rectifier units operating in parallel with each of said units having an excitation circuit, an input connected to power supply means and an output connected to a common bus, the combination comprising first means for measuring the output current of each of said rectifier units, second means for providing a common reference current, third means associated with each of said rectifier units for separately comparing said output current of each of said rectifier units with a portion of said common reference current, fourth means associated with each of said rectifier units and connected to be responsive to said third means for separately controlling said excitation circuit of each of said rectifier units in accordance with the larger of said portion of said common reference current and said output current of each of said rectifier units to maintain the output current of each of said rectifier units at substantially a predetermined value and fifth means for simultaneously varying the reference current supplied to each of said third means to vary the total output current of said units.

4. In a control system for a plurality of rectifier units operating in parallel with each of said units having an excitation circuit, a plurality of rectifier units, an input connected to power supply means and an output connected to a common bus, the combination comprising first means for measuring the output current of each of said rectifier units, second means for providing a common reference current, third means associated with each of said rectifier units for separately comparing said output current of each of said rectifier units with a portion of said reference current, fourth means associated with each of said rectifier units for separately controlling said excitation circuit of each of said rectifier units in accordance with the larger of said portion of said common reference current and said output current of each of said rectifier units to maintain the output current of each of said rectifier units at substantially a predetermined value, and fifth means for simultaneously varying the common reference current applied to each of said third means to vary the total output current of said plurality of rectifier units supplied to said common bus.

5. In a control system for a plurality of rectifier units operating in parallel with each of said units having an excitation circuit, an input connected to power supply means and an output connected to a common bus, the combination comprising first means for measuring the output current of each of said rectifier units, second means for providing a common reference current, third means associated with each of said rectifier units for separately comparing said output current of each of said rectifier units with a portion of said common reference current, magnetic amplifier means associated with each of said rectifier units for separately controlling said excitation circuit of each of said rectifier units in accordance with the larger of said portion of said common reference current and said output current of each of said rectifier units to maintain the output current of each of said rectifier units at substantially a predetermined value, and fourth means for independently varying the portion of said common reference current compared with the output current of each of said rectifier units to independently vary the output current of each of said rectifier units supplied to said common bus.

6. In a control system for a plurality of rectifier units operating in parallel with each of said units having an excitation circuit, an input connected to power supply means and an output connected to a common bus, the combination comprising first means for measuring the output current of each of said rectifier units, second means for providing a common reference current, third means associated with each of said rectifier units for separately comparing the output current of each of said rectifier units with a portion of said common reference current, magnetic amplifier means associated with each of said rectifier units for separately controlling the excitation circuit of each of said rectifier units in accordance with the larger of said portion of said common reference current and said output current of each of said rectifier units to maintain the output current of each of said rectifier units at substantially a predetermined value, fourth means for simultaneously varying the common reference current applied to each of said third means to vary the total output current of said plurality of rectifier units supplied to the common bus, and fifth means for independently varying the portion of said common reference current compared with the output current of each of said rectifier units to vary the output current of each of said rectifier units independently without affecting the output current of the balance of each of the rectifier units operating in parallel.

7. In a control system for a plurality of rectifier units operating in parallel with each of said units having an excitation circuit, an input connected to power supply means and an output connected to a common bus, the combination comprising first means for measuring the output current of each of said rectifier units, second means for providing a common reference current, third means associated with each of said rectifier units for separately comparing said output current of each of said rectifier units with a portion of said common reference current, a magnetic amplifier associated with each of said rectifier units, said magnetic amplifier having a control winding responsive to said third means and being connected to control the excitation circuit of each of said rectifier units, and circuit means to render said excitation circuit responsive to the larger of said compared currents to maintain said output current of each of said rectifier units at substantially a predetermined value and fourth means for independently varying the portion of the common reference applied to each of said third means to independently vary the portion of the total output current supplied by each unit.

8. In a control system for a plurality of rectifier units each including a plurality of rectifier devices, an excitation circuit, an input connected to power supply means and an output connected to a common bus for parallel operation of all units, the combination comprising first means for providing a measure of the output current of each of said units, second means for providing a reference current, magnetic amplifier means associated with each of said units having first and second windings connected to said first and second means respectively, for comparing a portion of said reference current with said measure of said output current, said magnetic amplifier means being connected to the excitation circuit of the associated unit to control the output current in accordance with the larger of said measure of said output current and said portion of said reference current, and third means for independently adjusting the portion of the reference current supplied to the magnetic amplifier means of each unit to vary the portion of the total output current supplied by each of said units to the common bus.

9. In a control system for a plurality of rectifier units each including a plurality of rectifier devices, an excitation circuit, an input connected to power supply means and an output connected to a common bus for parallel operation of all units, the combination comprising first means for providing a measure of the output current of each of said units, second means for providing a reference current, magnetic amplifier means associated with each of said units having first and second windings connected to said first and second means, respectively, for comparing a portion of said reference current with said measure of said output current, said magnetic amplifier means being connected to the excitation circuit of the associated unit to control the output current in accordance with the larger of said measure of said output current and said portion of said reference current, third means for independently adjusting the portion of the reference current supplied to the magnetic amplifier means of each unit to vary the portion of the total output current supplied by each of said units to the common bus, and fourth means for adjusting the reference current supplied to the magnetic amplifier means of all units to vary the total output current of all units supplied to the common bus.

10. In a control system for a plurality of rectifier units each including a plurality of rectifier devices, current controlling means associated with each of said rectifier devices, an input connected to power supply means and an output connected to a common bus for parallel operation of all units, the combination comprising first means for providing a measure of the output current of each of said units, second means for providing a reference current, magnetic amplifier means associated with each of said units having first and second windings connected to said first and second means, respectively, for comparing a portion of said reference current with said measure of said output current, said magnetic amplifier means being connected to the current controlling means of the associated unit to control the output current in accordance with the larger of said measure of said output current and said portion of said reference current, and third means for independently adjusting the portion of the reference current supplied to the magnetic amplifier means of each unit to vary the portion of the total output current supplied by each of said units to the common bus.

11. In a control system for a plurality of rectifier units each including a plurality of rectifier devices, current controlling means associated with each of said rectifier devices, an input connected to power supply means and an output connected to a common bus for parallel operation of all units, the combination comprising first means for providing a measure of the output current of each of said units, second means for providing a reference current, amplifier means associated with each of said units and connected to said first and second means for comparing a portion of said reference current with said measure of said output current, said amplifier means being connected to the current controlling means of the associated unit to control the output current in accordance with the larger of said measure of said output current and said portion of said reference current, and third means for independently adjusting the portion of the reference current supplied to the amplifier means of each unit to vary the portion of the total output current supplied by each of said units to the common bus.

References Cited in the file of this patent
UNITED STATES PATENTS

| | | |
|---|---|---|
| 2,107,263 | Winograd | Feb. 1, 1938 |
| 2,112,051 | Schmidt | Mar. 22, 1938 |
| 2,148,049 | Kern | Feb. 21, 1939 |
| 2,246,173 | Herskind | June 17, 1941 |
| 2,291,349 | Schmidt | July 28, 1942 |
| 2,349,633 | Meyers | May 23, 1944 |
| 2,758,251 | Shrider | Aug. 7, 1956 |